United States Patent [19]

Connor

[11] Patent Number: 4,873,406

[45] Date of Patent: Oct. 10, 1989

[54] MICROWAVE POPCORN POPPER

[76] Inventor: Gary L. Connor, HC 01 P.O. Box 74, Coulee DAM, Wash. 99116

[21] Appl. No.: 289,054

[22] Filed: Dec. 23, 1988

[51] Int. Cl.$^4$ ............................ H05B 6/80; A23L 1/18
[52] U.S. Cl. ........................ 219/10.55 E; 219/10.55 F; 99/323.5; 99/323.9; 99/DIG. 14; 426/241
[58] Field of Search .................. 219/10.55 E, 10.55 F, 219/10.55 R; 99/323.4, 323.5, 323.8, 323.9, DIG. 14, 451; 426/243, 241

[56] References Cited

U.S. PATENT DOCUMENTS

| | | | |
|---|---|---|---|
| 1,436,400 | 11/1922 | Mabey | 99/323.8 |
| 2,602,134 | 7/1952 | Nelson | 219/10.55 E |
| 2,939,379 | 6/1960 | Schmitt | 99/323.8 |
| 3,774,523 | 11/1973 | Moot | 99/323.8 |
| 4,158,760 | 6/1979 | Bowen et al. | 219/10.55 E |
| 4,299,160 | 11/1981 | Wokech | 219/10.55 E |
| 4,425,368 | 1/1984 | Watkins | 219/10.55 E |
| 4,495,816 | 1/1985 | McNamara | 219/10.55 G |
| 4,563,561 | 1/1986 | Vaith et al. | 219/10.55 E |
| 4,724,290 | 2/1988 | Campbell | 219/10.55 E |

Primary Examiner—Philip H. Leung
Attorney, Agent, or Firm—Jerry T. Kearns

[57] ABSTRACT

A microwave popcorn popper has a generally cylindrical open topped container with a snap on domed cover. A raised downwardly and outwardly tapering frusto conical partition is provided in the container, above an interior flat circular floor of the container. An elongated cylindrical tube extends through a central circular aperture in the partition and has a bottom end resting on the flat circular floor. An upwardly opening conical receptacle is provided in the bottom portion of the tube for holding a quantity of unpopped corn and oil. A circular cap over and open top end of the tube is formed by two semi-circular plates connected by a central hinge. In use, a quantity of unpopped corn is placed in the conical receptacle and the entire unit is placed in a conventional microwave oven. The conical receptacle concentrates the corn kernels at the central focal point of the microwaves within the oven. As the kernels pop, they move upward through the tube and exit through the pivotal cap into the surrounding container. A dispersing receptacle may be provided on the pivotal tube cap to dispense salt or butter on the popcorn if desired.

11 Claims, 4 Drawing Sheets

MICROWAVE POPCORN POPPER

BACKGROUND OF THE INVENTION

1. Field of the Invention

The present invention relates to microwave popcorn poppers, and more particularly pertains to a new and improved popcorn popper for popping conventional popcorn in a microwave oven. Currently, individuals generally utilize specially packaged popcorn contained within expandable bags for use in microwave ovens. Popcorn in this form is extremely expensive and individuals are unable to regulate the amount of popping oil utilized according to their individual taste. In order to overcome this problem, the present invention provides a reusable utensil for efficiently popping conventional popcorn in conventional microwave ovens.

2. Description of the Prior Art

Various types of microwave popcorn poppers are known in the prior art. A typical example of such a microwave popcorn popper is to be found in U.S. Pat. No. 4,299,160, which issued to G. Wokeck on Nov. 10, 1981. This patent discloses a receptacle for popping corn and microwave ovens which has a quadrilateral bowl with upwardly diverging side walls formed from a microwave penetrable material. A snap-on cover having four side walls is removably mountable upon an upper rim of the bowl. U.S. Pat. No. 4,496,816, which issued to G. McNamara on Jan. 29, 1985, discloses a microwave popcorn popping appliance having an upwardly opening conical receptacle for receiving unpopped corn. U.S. Pat. No. 4,563,561, which issued to H. Vaeth et al on Jan. 7, 1986, discloses nesting microwave transparent receptacles for popping corn. The popper receptacle has an inverted pyramidal shaped cavity and a cover receptacle is profiled at one end for encapsulating orientation over the popper receptacle. A dispenser is provided for distributing melted butter to the popped kernels. U.S. Pat. No. 4,724,290, which issued to M. Campbell on Feb. 9, 1988, discloses a microwave popcorn popper having a popping section transparent to microwaves, a container portion within the popping section for preventing an amount of popped corn from leaving the popping section and a partially microwave opaque section communicating with the popping section for receiving the popped corn. Dispensing apparatus for supplying melted butter to the popped corn after a time delay is also disclosed.

While the above mentioned devices are suited for their intended usage, none of these devices disclose a microwave popcorn popper having a centrally disposed vertical tube with an upwardly opening frusto conical receptacle for receiving unpopped corn kernels and popping oil. Additionally, none of the above devices disclose the use of a downwardly and outwardly inclined partition floor for directing popped corn away from the central focal point of the container within a microwave oven. Additional features of the present invention, not contemplated by the aforesaid prior art devices, include the provision of a vertically extending tube having an upwardly opening conical receptacle for receiving unpopped corn and having a cap formed by two semi-circular plates connected by a central hinge and provided with nesting quarter spherical segments for dispensing salt or butter to popcorn. Inasmuch as the art is relatively crowded with respect to these various types of microwave popcorn poppers, it can be appreciated that there is a continuing need for and interest in improvements to such microwave popcorn poppers, and in this respect, the present invention addresses this need and interest.

SUMMARY OF THE INVENTION

In view of the foregoing disadvantages inherent in the known types of microwave popcorn poppers now present in the prior art, the present invention provides an improved microwave popcorn popper. As such, the general purpose of the present invention, which will be described subsequently in greater detail, is to provide a new and improved microwave popcorn popper which has all the advantages of the prior art microwave popcorn poppers and none of the disadvantages.

To attain this, representative embodiments of the concepts of the present invention are illustrated in the drawings and make use of a generally cylindrical open topped container with a snap on domed cover. A raised downwardly and outwardly tapering frusto conical partition is provided in the container, above an interior flat circular floor of the container. An elongated cylindrical tube extends through a central circular aperture in the partition and has a bottom end resting on the flat circular floor. An upwardly opening conical receptacle is provided in the bottom portion of the tube for holding a quantity of unpopped corn and oil. A circular cap over and open top end of the tube is formed by two semi-circular plates connected by a central hinge. In use, a quantity of unpopped corn is placed in the conical receptacle and the entire unit is placed in a conventional microwave. The conical receptacle concentrates the corn kernels at the central focal point of the microwaves within the oven. As the kernels pop, they move upward through the tube and exit through the pivotal cap into the surrounding container. A dispensing receptacle may be provided on the pivotal tube cap to dispense salt or butter on the popcorn if desired.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved microwave popcorn popper which has all the advantages of the prior art microwave popcorn poppers and none of the disadvantages.

It is another object of the present invention to provide a new and improved microwave popcorn popper which may be easily and efficiently manufactured and marketed.

It is a further object of the present invention to provide a new and improved microwave popcorn popper which is of a durable and reliable construction.

An even further object of the present invention is to provide a new and improved microwave popcorn popper which is susceptible of a low cost of manufacture with regard to both materials and labor, and which accordingly is then susceptible of low prices of sale to the consuming public, thereby making such microwave popcorn poppers economically available to the buying public.

Still yet another object of the present invention is to provide a new and improved microwave popcorn popper which provides in the apparatuses and methods of the prior art some of the advantages thereof, while simultaneously overcoming some of the disadvantages normally associated therewith.

Still another object of the present invention is to provide a new and improved microwave popcorn popper for popping conventional popcorn in a microwave oven.

Yet another object of the present invention is to provide a new and improved microwave popcorn popper having a downwardly and outwardly inclined interior partition for directing popped corn away from the central focal point of the container to prevent burning of the popped kernels.

Even still another object of the present invention is to provide a new and improved microwave popcorn popper having a centrally disposed vertically extending tube with an upwardly opening conical receptacle for directing unpopped kernels to the central focal point of the container.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
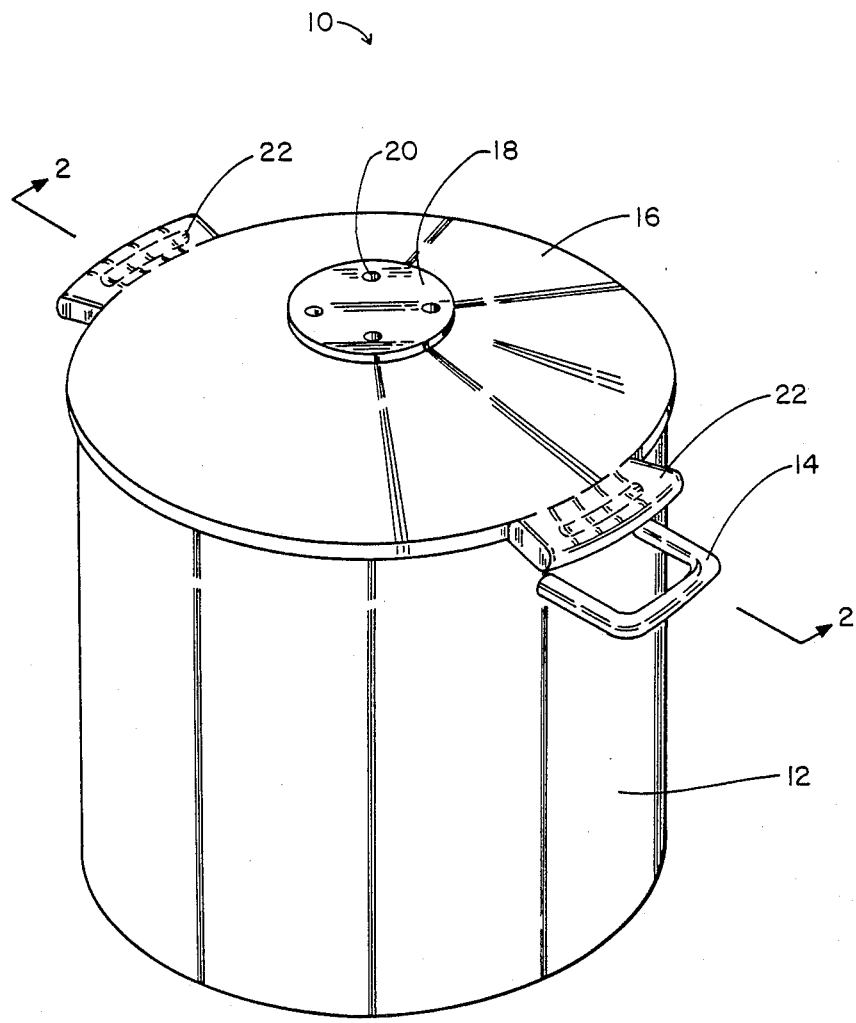
FIG. 1 is a perspective view of the microwave popcorn popper according to the first embodiment of the present invention.

With reference now to the drawings, and in particular to FIG. 1 thereof, a new and improved microwave popcorn popper embodying the principles and concepts of the present invention and generally designated by the reference numeral 10 will be described.

More specifically, it will be noted that the first embodiment 10 of the invention includes a generally cylindrical open topped container 12 provided with a dome shaped snap on cover 16. The cover 16 has a central vent plate 18 provided with a plurality of circular vent apertures 20 to vent expanding air and steam from within the interior of the container 12 during a popping operation. The cover 16 is provided with a pair of diametrically opposed handles 22. The container 12 is similarly provided with handles 14.

Figure 2:
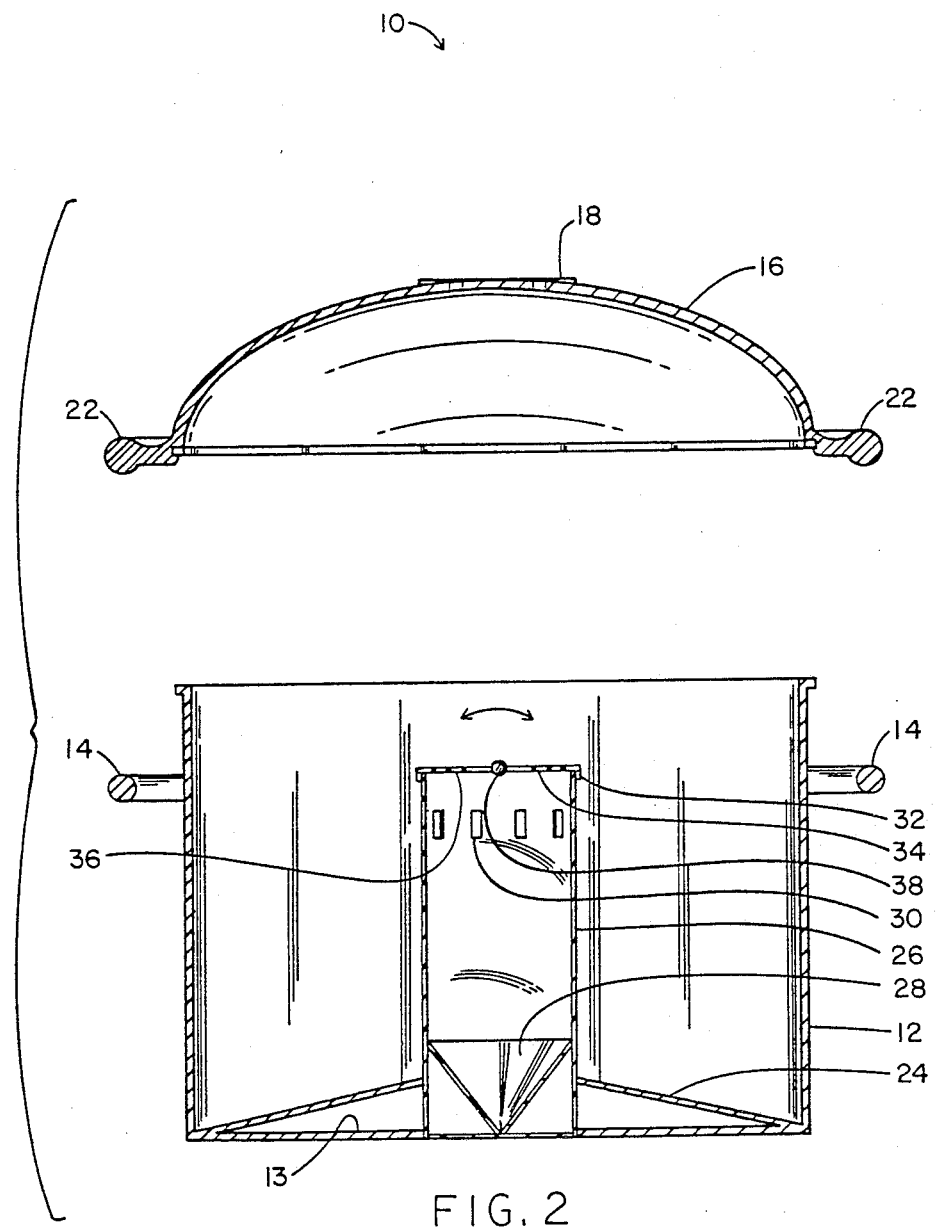
FIG. 2 is a longitudinal cross sectional view, taken along line 2—2 of FIG. 1.

FIG. 2 provides a longitudinal cross sectional view, which illustrates the internal components of the microwave popcorn popper 10 according to the first embodiment of the present invention. A raised frusto conical partition 24 in the container 12 is disposed above a flat circular floor 13. The partition 24 is downwardly and outwardly inclined to direct popped corn kernels away from the central focal point of the container 12 when in a microwave oven, to prevent burning of the already popped kernels. A cylindrical vertically extending tube 26 is received through a central circular aperture provided in the partition 24 and has a bottom end resting on the flat circular floor 13. An upwardly opening conical receptacle 28 is disposed in a bottom portion of the tube 26 to receive a quantity of unpopped corn kernels and popping oil. The conical receptacle 28 directs unpopped corn kernels to the central focal point of the container 12. A plurality of steam and air vent apertures 30 are spaced circumferentially around a top portion of the tube 26. A circular cap 32 is received over and open top end of the tube 26 and is formed by a pair of semicircular plates 34 and 36 connected by a central hinge 38. In use, the receptacle 28 is filled with a quantity of unpopped corn kernels and popping oil and the cap 32 is placed over the open top end of the tube 26. The dome cover 16 is then snapped on to the container 12 and the entire unit is placed into a microwave oven. As the corn kernels in the receptacle 28 pop, they move upwardly within the tube 26 and force the pivotal plates 34 and 36 to pivot open, allowing the popcorn to fall onto the inclined partition 24. The corn falling on the partition 24 moves by gravity along the incline downwardly and outwardly, away from the central focal point of the container 12. This prevents burning of the already popped corn. The various components including the tube 26, cap 32, lid 16, receptacle 28 and container 12 are preferably formed from a microwave transparent washable plastic material. These elements are preferably separably formed to allow convenient cleaning, but may be integrally molded if desired.

Figure 2A:
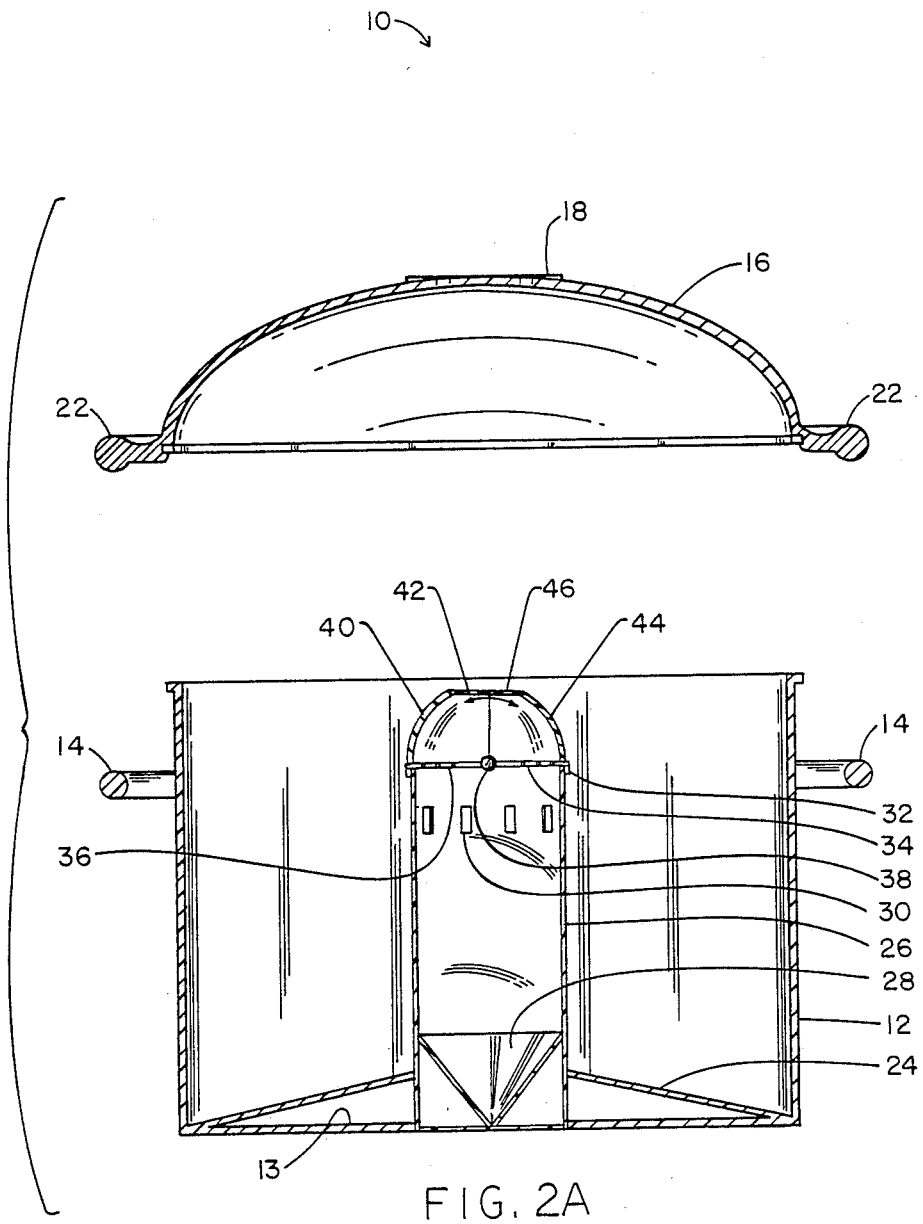
FIG. 2A is a longitudinal cross sectional view illustrating a slightly modified popcorn popper according to a second embodiment of the present invention.
Figure 3:
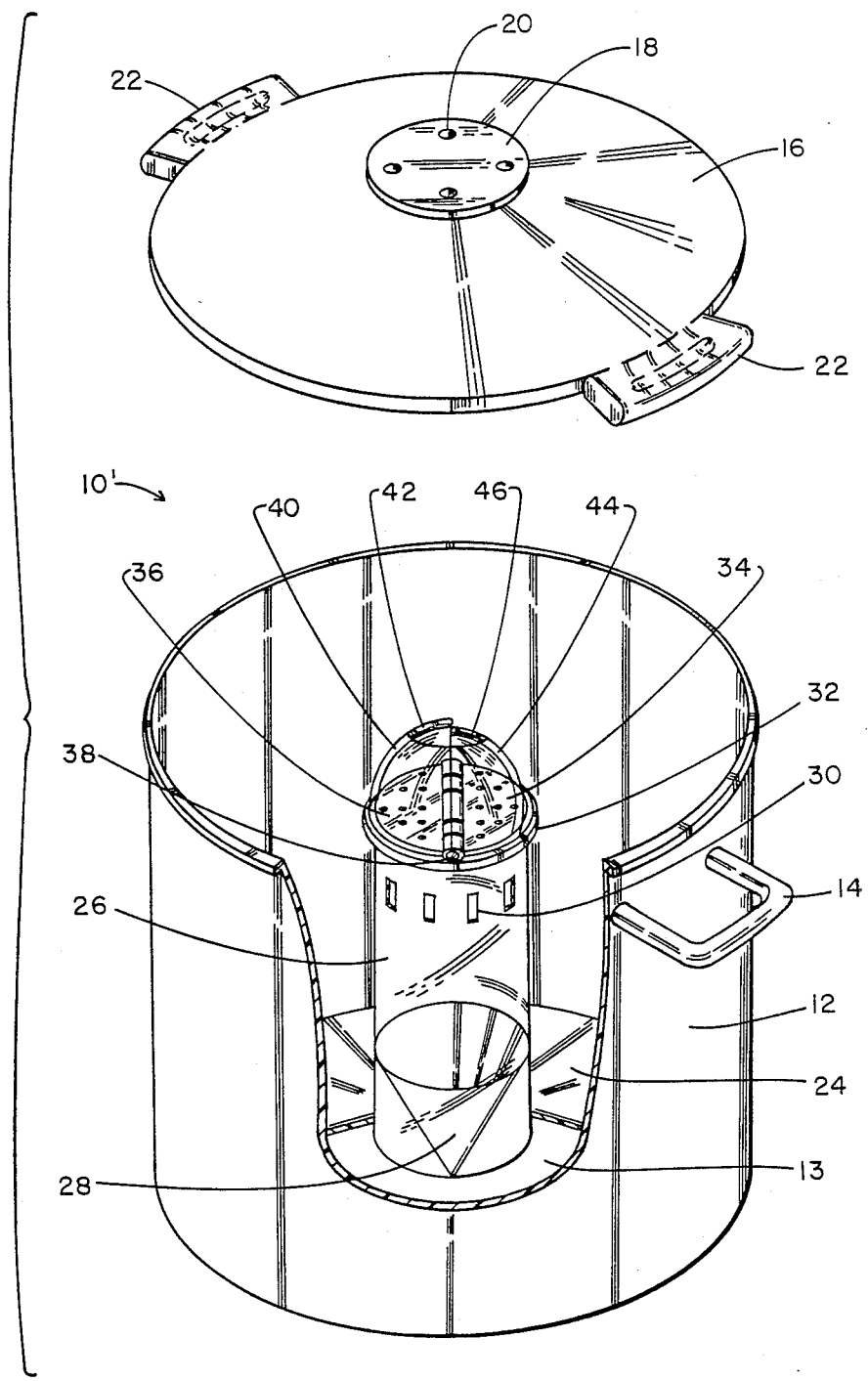
FIG. 3 is an exploded perspective view, partially cut away, illustrating the microwave popcorn popper according to the second embodiment of the present invention.

FIGS. 2A and 3 illustrate a slightly modified second embodiment 10' of the present invention. The second embodiment 10' is identically formed as described with reference to FIGS. 1 and 2, with the exception that the cap 32 disposed over the open top end of the tube 26 is provided with a mechanism for dispensing a quantity of butter and/or salt to the popcorn as it leaves the tube 26. A pair of quarter spherical segments 40 and 44 are secured on an upper surface of each of the plates 34 and 36. The quarter spherical segments 40 and 44 are slightly different in diameter such that the smaller segment 44 may nest within the slightly larger segment 40 when the pivotal plates 34 and 36 are forced to an open position by the popping corn. As illustrated, the plates 34 and 36 are each provided with a plurality of apertures to allow butter or salt within the dome segments 40 and 44 to be dispensed onto the popping corn within the tube 26. The segments 40 and 44 are each provided with a semi-circular open top portion 42, 46, which allows butter and salt to be placed within the interior of the dispensing receptacles. As the unpopped corn kernels within the receptacle 28 pop and move upwardly through the tube 26, the uppermost popcorn kernels contact the pivotal plates 34 and 36 causing them to pivotally move and shake as indicated by the arrow. This causes the butter and salt to be dispensed through the apertures in the plates 34 and 36 and onto the uppermost popcorn kernels. It should be noted that the constant vibrating and shaking action caused by the popping corn causes any unpopped corn kernels in the upper portion of the tube 26 to fall downwardly between the popped corn kernels and back into the receptacle 28 where they are then popped.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A microwave popcorn popper, comprising:
a generally cylindrical open topped container having a flat circular floor;
a domed cover removably received in sealing relation over said open topped container, a plurality of vent apertures provided in said cover;
a raised frusto conical partition having a radially outwardly and axially downwardly inclined upper surface in said container, above said circular floor;
an elongated cylindrical tube centrally disposed in said container, said tube received through a central circular aperture in said frusto conical partition with a bottom end of said tube resting on said flat circular floor;
an upwardly opening cone received in a bottom of said tube for holding a quantity of unpopped corn and popping oil;
a plurality of vent apertures spaced circumferentially around a top portion of said tube; and
a circular cap over an open top end of said tube, said cap formed by two semi-circular plates connected by a central hinge.

2. The microwave popcorn popper of claim 1, further comprising a pair of quarter segment nesting spherical dispensing receptacles on said semi-circular plate; and
a plurality of apertures extending through said each of said plates.

3. A microwave popcorn popper, comprising:
container means for holding a quantity of popped corn;
vertically extending tube means in said container means for directing popped corn to said container means;
an upwardly opening conical receptacle in a bottom portion of said tube means for holding a quantity of unpopped corn;
cover means for closing said container means; and
a cap having a pair of semi-circular plates connected by a central hinge on an upper end of said tube means for separating said tube means from said container means and for allowing popped corn into said container means.

4. The microwave popcorn popper of claim 3, further comprising dispensing means on said cap for dispensing butter and salt on popped corn.

5. The microwave popcorn popper of claim 4, wherein said dispensing means comprises a pair of nesting quarter segment spherical dispensing receptacles on said semi-circular plate; and
said semi-circular plates are each provided with a plurality of apertures.

6. The microwave popcorn popper of claim 3, further comprising a downwardly and outwardly inclined partition in said container means for directing popped corn away from a central portion of said container means to prevent burning.

7. The microwave popcorn popper of claim 6, wherein said tube means is received through a central aperture in said partition.

8. The microwave popcorn popper of claim 7, wherein said container means has a flat circular interior floor and said partition is generally frusto conical and disposed above said floor.

9. A microwave popcorn popper, comprising:
container means for holding a quantity of popped corn;
vertically extending tube means in said container means for directing popped corn to said container means;
an upwardly opening conical receptacle in a bottom portion of said tube means for holding a quantity of unpopped corn adjacent a focal point of a miocrowave oven;
cover means for closing said container means; and
a downwardly and outwardly inclined partition in said container means for directing popped corn away from a central portion of said container means to prevent burning.

10. The microwave popcorn popper of claim 9, wherein said tube means is received through a central aperture in said partition.

11. The microwave popcorn popper of claim 10, wherein said container means has a flat circular interior floor and said partition is generally frusto conical and disposed above said floor.

* * * * *